No. 790,865. PATENTED MAY 23, 1905.
D. E. ANTHONY.
CORN HARVESTER.
APPLICATION FILED DEC. 11, 1901.
2 SHEETS—SHEET 2.
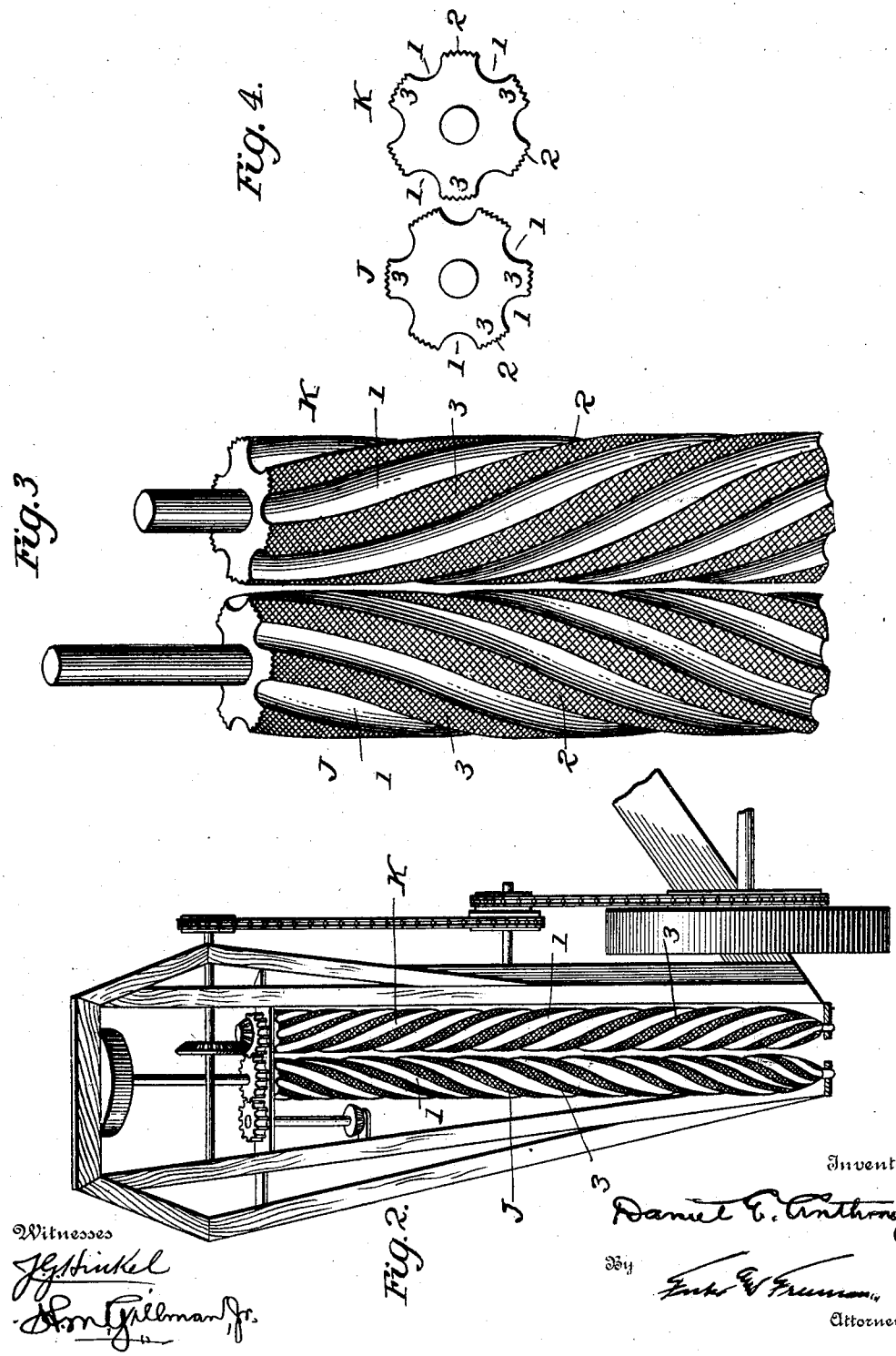

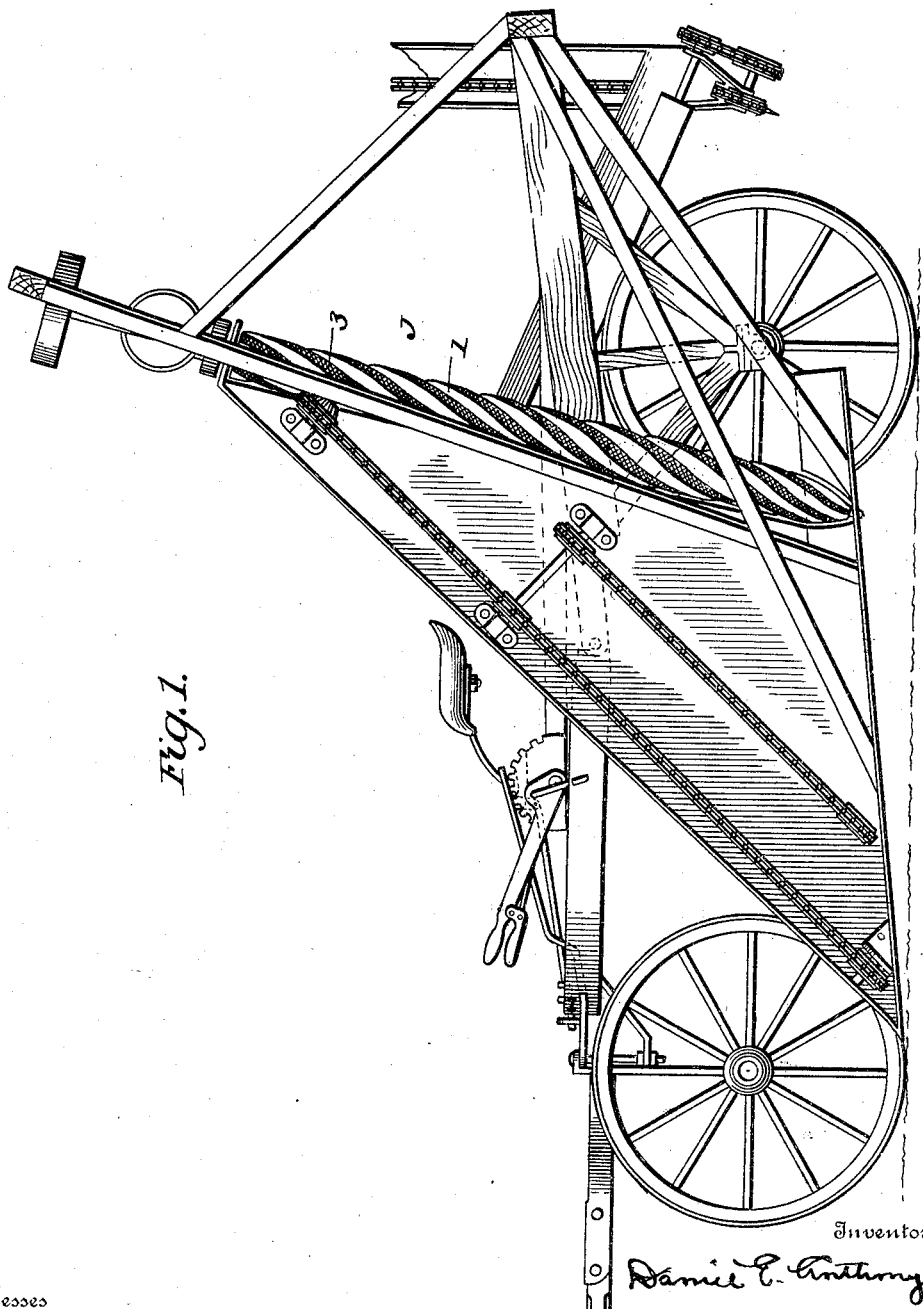

No. 790,865. Patented May 23, 1905.

UNITED STATES PATENT OFFICE.

DANIEL ELMER ANTHONY, OF AKRON, IOWA, ASSIGNOR OF ONE-HALF TO EMERY E. MELLEN, OF AKRON, IOWA.

CORN-HARVESTER.

SPECIFICATION forming part of Letters Patent No. 790,865, dated May 23, 1905.

Application filed December 11, 1901. Serial No. 85,506.

*To all whom it may concern:*

Be it known that I, DANIEL ELMER ANTHONY, a citizen of the United States, residing at Akron, in the county of Plymouth and State of Iowa, have invented certain new and useful Improvements in Corn-Harvesters, of which the following is a specification.

My invention relates to certain improvements in that class of corn-harvesters illustrated in Letters Patent granted to me January 1, 1901, No. 665,301; and my invention consists in constructing and arranging the snapping-rolls of such a harvester as fully set forth hereinafter and as illustrated in the accompanying drawings, in which—

Figure 1 is a side elevation of a harvester embodying my improvements. Fig. 2 is a rear elevation of sufficient to show the snapping-rolls and supporting parts; Fig. 3, a rear perspective view of parts of the rolls, and Fig. 4 an end view of the rolls.

One of the characteristic features of my aforesaid patented invention is the use of rearwardly-inclined rolls at the rear of the gatherers, one of which rolls has a spiral groove of such a character that the rolls may pass the standing corn without breaking or bending the same to any substantial extent, the corn being received by the grooves of the roll the area of contact moving progressively upward as the rolls rotate and the machine moves forward. In the said construction the spiral grooves are in one of the rolls, while the other roll has projections which engage the stalks and tend to hold them in and feed them through the grooves during said progressive action. My improvement consists in substituting for the roll provided with projections for engaging the stalks a second grooved roll, the grooves in which, however, are reversely wound to those in the other roll, and the two rolls are so arranged that the ungrooved portions of one roll will be opposite the grooved portions of the other roll, whereby the stalks may enter the grooves of either roll with the same action as in my patented construction except that in the present case the ungrooved portion of either roll will act in the same manner as the ungrooved roll in my patented construction to hold the stalks in and feed them along the grooves without breaking them.

The rolls are arranged at the rear of the gatherers in a position inclined somewhat from the vertical, and, as shown in the drawings, there are two rolls J K, each of which has continuous spiral grooves 1 1 1, the grooves of each roll being opposite the ungrooved portions 3 3 of the other roll, and preferably there is formed upon these ungrooved portions teeth or projections which will aid in catching the stalks and feeding them along the grooves during the rotation of the rolls and the forward movement of the machine. As shown and preferred, these teeth or projections are formed by roughening the surface of each roll between its grooves, so as to form comparatively small projections or teeth 2, like those of a coarsely-cut rasp; but they may be formed in any other suitable way and be of any desired size.

The spaces between the grooves on either roll may be of any desired width, and the grooves may be of any desired size and cross-sectional form, and the spirals may be of any required pitch or twist provided it is materially greater than the diameter of the rolls and of such inclination to the angle of the rolls that the stalks when occupying a position in the grooves may stand substantially upright.

It will be seen that as the pitch of the spiral grooves is materially greater than the diameter of the rolls the latter may be arranged so nearly vertical as to act on but one or two hills of corn at a time with less friction than when the rolls are arranged approximately horizontal and act on a number of hills of corn at once. Further, the machine may be driven forward more rapidly with a slower movement of the rolls than when the latter are more nearly horizontal with the grooves of a pitch about equal to the diameters of the rolls. The rolls are supported and driven as in my aforesaid patented machine or in any other suitable manner not necessary to be herein described.

By grooving both rolls I can increase the number of grooves, and consequently take in a greater number of stalks at a revolution of the rolls.

Without limiting myself to the precise construction and arrangement of parts shown, I claim as my invention—

1. In a corn-harvester, the combination of the gatherers, and a pair of snapping-rolls inclined upwardly and rearwardly and each provided with continuous unobstructed spiral grooves and the grooves in one being reversely wound to those in the other, the ungrooved portions of one roll being opposite without extending into the grooved portions of the other roll, the angle of inclination of the rolls being such that the engaging portions of the grooves are substantially vertical, substantially as set forth.

2. In a corn-harvester, the combination of the gatherers, and a pair of snapping-rolls inclined upwardly and rearwardly and each provided with continuous unobstructed spiral grooves and teeth or projections on the ungrooved portions, and the grooves in one being reversely wound to those in the other, the ungrooved portions of one roll being opposite without extending into the grooved portions of the other roll, and the angle of inclination of the rolls being such that the engaging portions of the grooves are substantially vertical, substantially as set forth.

In testimony whereof I have signed my name to this specification in the presence of two subscribing witnesses.

DANIEL ELMER ANTHONY.

Witnesses:
CHARLES E. FOSTER,
W. CLARENCE DUVALL.